(12) United States Patent
Lathrop et al.

(10) Patent No.: US 9,876,343 B2
(45) Date of Patent: Jan. 23, 2018

(54) TRANSFER SWITCH INCLUDING MANAGEMENT SYSTEM AND ASSOCIATED METHOD

(71) Applicant: EATON CORPORATION, Cleveland, OH (US)

(72) Inventors: Todd Matthew Lathrop, Oakdale, PA (US); Bert Popovich, Carnegie, PA (US)

(73) Assignee: EATON CORPORATION, Cleveland, OH (US)

( * ) Notice: Subject to any disclaimer, the term of this patent is extended or adjusted under 35 U.S.C. 154(b) by 437 days.

(21) Appl. No.: 14/608,468

(22) Filed: Jan. 29, 2015

(65) Prior Publication Data
US 2016/0226235 A1 Aug. 4, 2016

(51) Int. Cl.
| | |
|---|---|
| *H02J 3/14* | (2006.01) |
| *H02H 3/08* | (2006.01) |
| *H02H 3/05* | (2006.01) |
| *H02H 11/00* | (2006.01) |
| *H02J 1/10* | (2006.01) |

(52) U.S. Cl.
CPC ............... *H02H 3/08* (2013.01); *H02H 3/05* (2013.01); *H02H 11/005* (2013.01); *H02J 1/10* (2013.01); *H02J 3/14* (2013.01); *Y04S 20/222* (2013.01)

(58) Field of Classification Search
CPC .......... H02H 3/05; H02H 3/08; H02H 11/005; H02J 1/10; H02J 3/14; Y02B 70/3225; Y04S 20/222
See application file for complete search history.

(56) References Cited

U.S. PATENT DOCUMENTS

| | | | |
|---|---|---|---|
| 7,948,117 B2 | 5/2011 | Lathrop et al. | |
| 8,410,633 B2* | 4/2013 | Batzler | H02J 3/14 307/39 |
| 8,415,830 B2* | 4/2013 | Lim | H02J 3/14 307/39 |
| 9,088,180 B2* | 7/2015 | Wedel | H02J 3/14 |
| 2010/0019574 A1* | 1/2010 | Baldassarre | H02J 3/14 307/23 |
| 2013/0187462 A1* | 7/2013 | Lim | H02J 9/066 307/39 |
| 2016/0156197 A1* | 6/2016 | Batzler | H02J 3/14 307/23 |

* cited by examiner

*Primary Examiner* — Patrick O'Neill
(74) *Attorney, Agent, or Firm* — Eckert Seamans; Nathaniel Wilks; Grant Coffield

(57) ABSTRACT

An automatic transfer switch includes a first switching apparatus having a first state to electrically connect at least one load to a primary power source and a second state to electrically connect the at least one load to a secondary power source; a sensor structured to sense information related to the power draw of the at least one load; and a control unit structured to determine the power draw of a selected one of the loads based on the output of the sensor, to compare the power draw of the selected load to a power capacity of the secondary power source, to allow the selected load to turn on if the power capacity of the secondary power source is at least greater than the power draw of the selected load, and to otherwise prevent the selected load from turning on.

15 Claims, 3 Drawing Sheets

TRANSFER SWITCH INCLUDING MANAGEMENT SYSTEM AND ASSOCIATED METHOD

BACKGROUND

Field

The disclosed concept pertains generally to transfer switches, and, more particularly, to an automatic transfer switch including a load management system. The disclosed concept also pertains to load management methods for automatic transfer switches.

Background Information

Transfer switches are employed to protect critical electrical loads against loss of power from a primary power source (e.g., utility power) backed up by a secondary power source (e.g., a generator). The transfer switch is electrically connected to both of the power sources and supplies a number of loads with power from one of the two power sources. In the event that power is lost from the primary power source, the transfer switch transfers the load to the secondary power source. This transfer can be manual or automatic. After the primary power source is restored, the load is transferred back to the primary power source.

In an automatic transfer switch (ATS), a controller or other intelligence of the ATS initiates the transfer when the primary power source fails or falls below, or rises above, a predetermined voltage and/or frequency. If the secondary power source is a standby generator, then the ATS initiates generator startup and transfers to the secondary power source when sufficient generator voltage is available. When the primary power source is restored, the ATS automatically transfers the load back to the primary power source and initiates generator shutdown. In the event that the primary power source fails and the secondary power source does not appear, then the ATS remains electrically connected to the primary power source until the secondary power source does appear. Conversely, if electrically connected to the secondary power source and the secondary power source fails while the primary power source is still unavailable, then the ATS remains electrically connected to the secondary power source.

An ATS automatically performs the transfer functions and can include, for example and without limitation, a power contactor or two circuit breakers to implement the ATS operations, and a controller (or other intelligence or supervisory circuit) to constantly monitor the condition of the power sources and provide automatic control of the switch and related circuit operation.

Certain systems and installations (e.g., without limitation, data centers; hospitals; water treatment plants; other critical processes that need the constant supply of power to a system load) employ a power system structured to provide an uninterruptable power supply (UPS). UPSs are well known. The primary power source is usually an electric utility or the public power grid, and the secondary power source is usually a generator. Alternatively, there could be two generators used instead of the utility or public power grid, or there could be two utilities. Basically, any suitable power sources that need to be switched with a load output can be employed.

In many situations, the secondary power source has a limited capacity and may not be capable of providing power to all the loads. For example, an air conditioning system draws a significant amount of power and when the secondary power source is a backup generator with a limited capacity, it may not be able to provide enough power to the air conditioning system. One prior transfer switch is designed for use with air conditioning systems and a generator. The transfer switch monitors a thermostat input to start the air conditioning. When the transfer switch receives the thermostat input, it then checks the percentage of maximum generator output that the generator is operating at. If the generator output is below 80% of the maximum generator output, the transfer switch allows the air conditioning system to start. If the generator output is at 80% or higher of the maximum generator output, the transfer switch does not allow the air conditioning system to start.

While the prior transfer switch aims to prevent the connected generator from becoming overburdened by the air conditioning system, it sacrifices efficiency of use of the generator and still presents a risk of allowing the generator to become overburdened. For example, the air conditioning system may draw less than 20% of the maximum output of the generator, and thus the prior transfer switch may prevent operation of the air conditioning system even though it would not overburden the generator. In another case, the air conditioning system may draw greater than 20% of the maximum output of the generator, in which case the transfer switch would allow the air conditioning system to operate even though it would overburden the generator. With limitless combinations of air conditioning systems and generators, the amount of the maximum output of the generator the air conditioning system uses may vary considerably. Thus, the prior transfer switch cannot provide efficient use of the generator as well as protecting it from becoming overburdened.

There is therefore room for improvement in transfer switches.

SUMMARY

In accordance with one aspect of the disclosed concept an ATS is structured to determine whether to turn on a load or prevent the load from turning on based on the power draw of the load and the power capacity of a secondary power source.

In one embodiment, an automatic transfer switch comprises: a first switching apparatus having a first state to electrically connect at least one load to a primary power source and a second state to electrically connect the at least one load to a secondary power source; a sensor structured to sense information related to the power draw of the at least one load; and a control unit structured to determine the power draw of a selected one of the loads based on the output of the sensor, to compare the power draw of the selected load to a power capacity of the secondary power source, to allow the selected load to turn on if the power capacity of the secondary power source is at least greater than the power draw of the selected load, and to otherwise prevent the selected load from turning on.

In another embodiment, a method of managing loads electrically connected to an automatic transfer switch structured to switch between a primary power source and a secondary power source comprises: sensing a control signal to turn on a selected one of the loads; sensing a power capacity of the secondary power source; comparing a power draw of the selected load to a power capacity of the secondary power source; allowing the selected load to turn on if the power capacity of the secondary power source is at least greater than the power draw of the selected load; and otherwise preventing the selected load from turning on.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
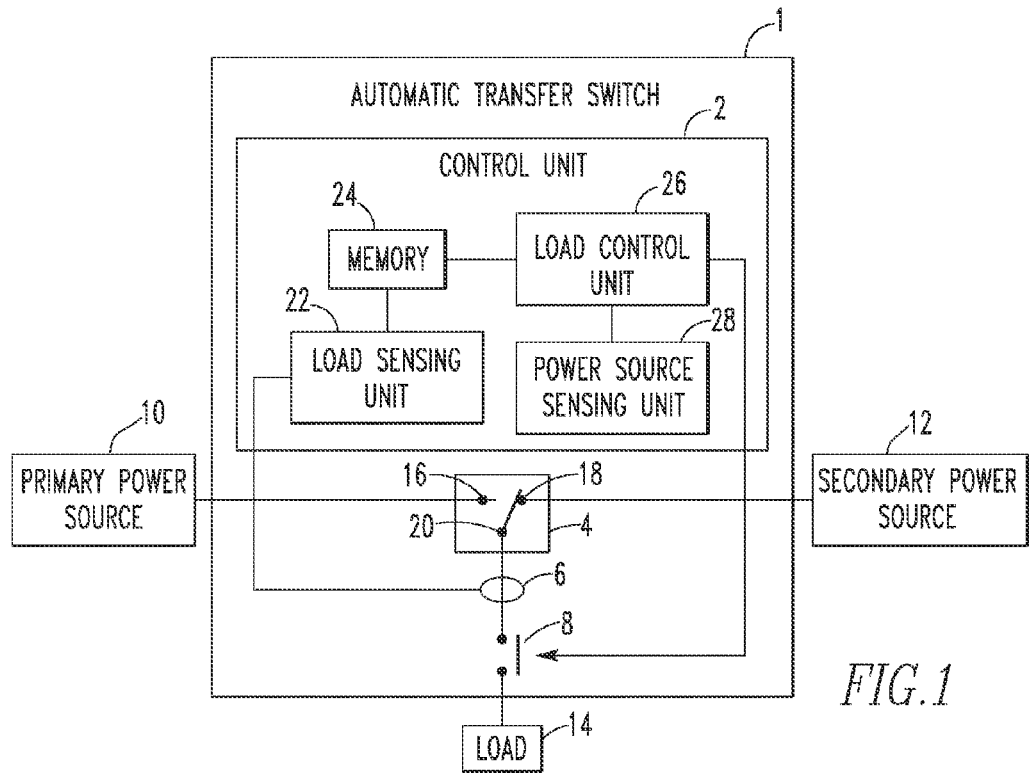
FIGS. 1 and 2 are schematic diagrams of automatic transfer switches (ATS) including load management in accordance with example embodiments of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data (e.g., without limitation, a computer; a workstation; a personal computer; a controller; a digital signal processor; a microprocessor; a microcontroller; a microcomputer; a central processing unit; a mainframe computer; a mini-computer; a server; a networked processor; a programmable logic controller; or any suitable processing device or apparatus).

As employed herein, the term "automatic" shall mean that a processor can change the state of a number of switches electrically if permitted by a corresponding logic state. The term "automatic" expressly excludes manual operation.

As employed herein, the "power capacity" of a power source shall mean the maximum capacity of the power source minus the present power drawn from the power source by connected loads. For example, if the maximum power capacity of a power source is 14 kW and the present power drawn from the power source by connected loads is 5 kW, the power capacity of the power source is 9 kW.

FIG. 1 is a block diagram in schematic form of an automatic transfer switch (ATS) 1 in accordance with an example embodiment of the disclosed concept. The ATS 1 includes a control unit 2, a first switching apparatus 4, a sensor 6, and a second switching apparatus 8.

The ATS 1 is electrically connected to a primary power source 10 (e.g., without limitation, utility power) and a secondary power source 12 (e.g., without limitation, a generator). The ATS 1 is also electrically connected to a load 14. The ATS 1 is configured to provide power from the primary power source 10 or the secondary power source 12 via the first switching apparatus 4.

The first switching apparatus 4 includes first, second, and third terminals 16,18,20. The first terminal 16 is configured to electrically connect to the primary power source 10, the second terminal 18 is configured to electrically connected to the secondary power source 12, and the third terminal 20 is configured to electrically connect to the load 14 via the second switching apparatus 8. The first switching apparatus 4 is switchable between a first state in which the first terminal 16 is electrically connected to the third terminal 20 and a second state in which the second terminal 18 is electrically connected to the third terminal 20. When the first switching apparatus 4 is in the first state and the second switching apparatus 8 is closed, the ATS 1 is configured to provide power from the primary power source 10 to the load 14, and when the first switching apparatus 4 is in the second state and the second switching apparatus 8 is closed, the ATS 1 is configured to provide power from the secondary power source 12 to the load 14. The ATS 1 may be configured to automatically switch the first switching apparatus 4 from the first state to the second state based on the statuses of the primary power source 10 and the secondary power source 12. For example and without limitation, the ATS 1, in response to the primary power source 10 failing to provide power, the ATS 1 may switch the first switching apparatus 4 from the first state to the second state to allow the secondary power source 12 to provide power to the load 14.

The sensor 6 is preferably a current sensor disposed between the first switching apparatus 4 and the load 14. The sensor 6 is configured to sense the amount of current being drawn by the load 14. Based on the amount of current sensed by the sensor 6, the total amount of power by all loads, in the case that the ATS 1 is electrically connected to multiple loads (see FIG. 3) can be determined. Based on changes in the amount of current sensed by the sensor 6 when the load 14 is turned on, the amount of power drawn by the load 14 can be determined.

The second switching apparatus 8 is electrically connected between the first switching apparatus 4 and the load 14. When the second switching apparatus 8 is closed, the load 14 is electrically connected to the third terminal 20 of the first switching apparatus 4, and when the second switching apparatus 8 is open, the load 14 is electrically disconnected from the third terminal 20 of the first switching apparatus 4. The second switching apparatus 8 is configured to open and close under control of the control unit 2. In some example embodiments of the disclosed concept, the second electrical switching apparatus 8 is an interposing relay. However, it is contemplated that any suitable electrically or mechanically controlled switch may be employed in the second switching apparatus 8 without departing from the scope of the disclosed concept.

The control unit 2 includes a load sensing unit 22, memory 24, a load control unit 26, and a power source sensing unit 28. The load sensing unit 22 is configured to receive information from the sensor 6. When the load 14 is turned on, the load sensing unit 22 uses changes in the output of the sensor 6 to determine how much power the load 14 draws. The load sensing unit 22 determines the amount of power the load 14 draws in absolute units (e.g., without limitation, kW), as opposed to relative units (e.g., without limitation, percentage), and stores the amount in the memory 24. The load sensing unit 22 also determines the total power drawn by all loads electrically connected to the ATS 1 based on the output of the sensor 6.

The power source sensing unit 28 is configured to determine the power capacity of the secondary power source 12. The power capacity of the secondary power source 12 is determined based on the maximum power capacity of the secondary power source 12 and the current total power drawn from the secondary power source 12 by connected loads. The maximum power capacity of the secondary power source 12 is determined based on, for example and without limitation, manual inputs by the end user via, without limitation, programming the maximum power capacity of the secondary power source 12 into the control unit 2. The control unit 2 can be programmed via, without limitation, dip switches, potentiometers, etc. The power factor of the secondary power source 12 may also be programmed into the control unit 2. In some embodiments of the disclosed concept, when the power factor of the secondary power source 12 is not programmed into the control unit 2, the control unit 2 is structured to assume that the power factor of the secondary power source 12 is 1. The current total power drawn from the secondary power source 12 is determined by the load sensing unit 22 based on the output of the sensor 6. The power source sensing unit 28 determines the power capacity of the secondary power source 12 as the difference between the maximum capacity of the secondary power source 12 and the total current power drawn from the secondary power source 12. The power source sensing unit 28 determines the power capacity of the secondary power source 12 in absolute units (e.g., without limitation, kW).

The load control unit 26 is configured to sense when the load 14 is attempting to turn on. If the first switching apparatus 4 is in the second state, the load control unit 26 determines whether the power capacity of the secondary power source 12 is greater than the amount of power draw of the load 14 stored in the memory 24. If the load control unit 26 determines that the power capacity of the secondary power source 12 is greater than the amount of power draw of the load 14, the load control unit 26 controls the second switching apparatus 8 to close, thus allowing the load 14 to turn on. However, if the load control unit 26 determines that the power capacity of the secondary power source 12 is less than the power draw of the load 14, the load control unit 26 controls the second switching apparatus 8 to open, thus preventing the load 14 from turning on.

It is contemplated that in some example embodiments of the disclosed concept, when the load control unit 26 senses that the load 14 is attempting to turn on and the first switching apparatus 4 is in the first state, the load control unit 26 will allow the load 14 to turn on since the power capacity of the primary power source 10 is assumed to be sufficient to handle the load 14. When the load 14 turns on, the load sensing unit 22 will determine the power draw of the load 14 based on the change in the output of the sensor 6. The load sensing unit 22 will then store the power draw of the load 14 in the memory 24. In this manner, the power draw of the load 14 can be determined and stored in memory 24 before the first switching apparatus 4 switches to the second state where power is provided by the secondary power source 12.

It is contemplated that in some example embodiments of the disclosed concept, the load control unit 26 will add a predetermined percentage to the power draw of the load 14 before comparing it to the power capacity of the secondary power source 12. In more detail, if the load control unit 26 determines that the power capacity of the secondary power source 12 is greater than the power draw of the load 14 plus the predetermined percentage, the load control unit 26 controls the second switching apparatus 8 to close, thus allowing the load 14 to turn on. However, if the load control unit 26 determines that the power capacity of the secondary power source 12 is less than the power that the power draw of the load 14 plus the predetermined percentage, the load control unit 26 controls the second switching apparatus 8 to open, thus preventing the load 14 from turning on. Adding the predetermined percentage to the power draw of the load 14 accounts for variations in the starting current of the load 14 or other fluctuations that cause the load 14 to draw more power than anticipated.

It is further contemplated that is some example embodiments of the disclosed concept, the load sensing unit 22 determines the power draw of the load 14 draws during a predetermined starting period of the load 14 and stores this value in the memory 24. During the predetermined starting period of the load 14, the load 14 goes through the process of turning on. For certain types of loads such as, without limitation, air conditioning units, more power is used during the starting period than during regular operation. The load control unit 26 then compares the power capacity of the secondary power source 12 to the power draw of the load 14 from the predetermined starting period to determine whether to control the second switching apparatus 8 to open or close.

Figure 2:
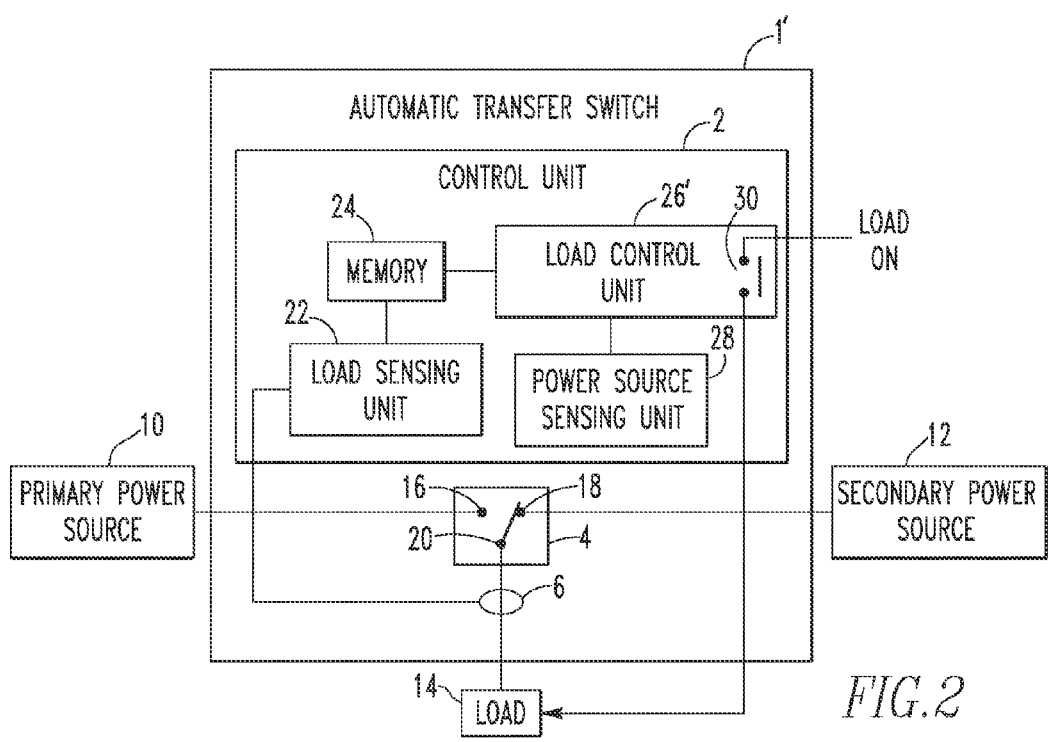

FIG. 2 is a block diagram in schematic form of an ATS 1' in accordance with another example embodiment of the disclosed concept. The ATS 1 of FIG. 2 is similar to the ATS 1' of FIG. 1. However, the ATS 1' of FIG. 2 includes a load control unit 26' that is configured to receive a LOAD ON signal. The LOAD ON signal is a control signal that turns on the load 14. In some example embodiments of the disclosed concept, the load 14 is an air conditioning unit and the LOAD ON signal is generated by a thermostat.

The load control unit 26' of FIG. 2 includes a switch 30. Opening the switch 30 prevents the LOAD ON signal from reaching the load 14, thus preventing the load 14 from turning on. Closing the switch 30 allows the LOAD ON signal to reach the load 14, thus allowing it to turn on in response to the LOAD ON signal.

The load control unit 26' is configured to sense when the LOAD ON signal is attempting to turn on the load 14. If the first switching apparatus 4 is in the second state, the load control unit 26' determines whether the power capacity of the secondary power source 12 is greater than the power draw of the load 14 stored in the memory 24. If the load control unit 26' determines that the power capacity of the secondary power source 12 is greater than the power draw of the load 14, the load control unit 26 controls the switch 30 to close, thus allowing the LOAD ON signal to turn on the load 14. However, if the load control unit 26' determines that the power capacity of the secondary power source 12 is less than the power draw of the load 14, the load control unit 26 controls the switch 30 to open, thus preventing the LOAD ON signal from turning on the load 14.

By intercepting the LOAD ON signal and controlling whether it reaches the load 14, the ATS 1' of FIG. 2 is able to control whether the load 14 turns on without the second switching apparatus 8. Thus, the second switching apparatus 8 may be omitted from the ATS 1' of FIG. 2.

Figure 3:
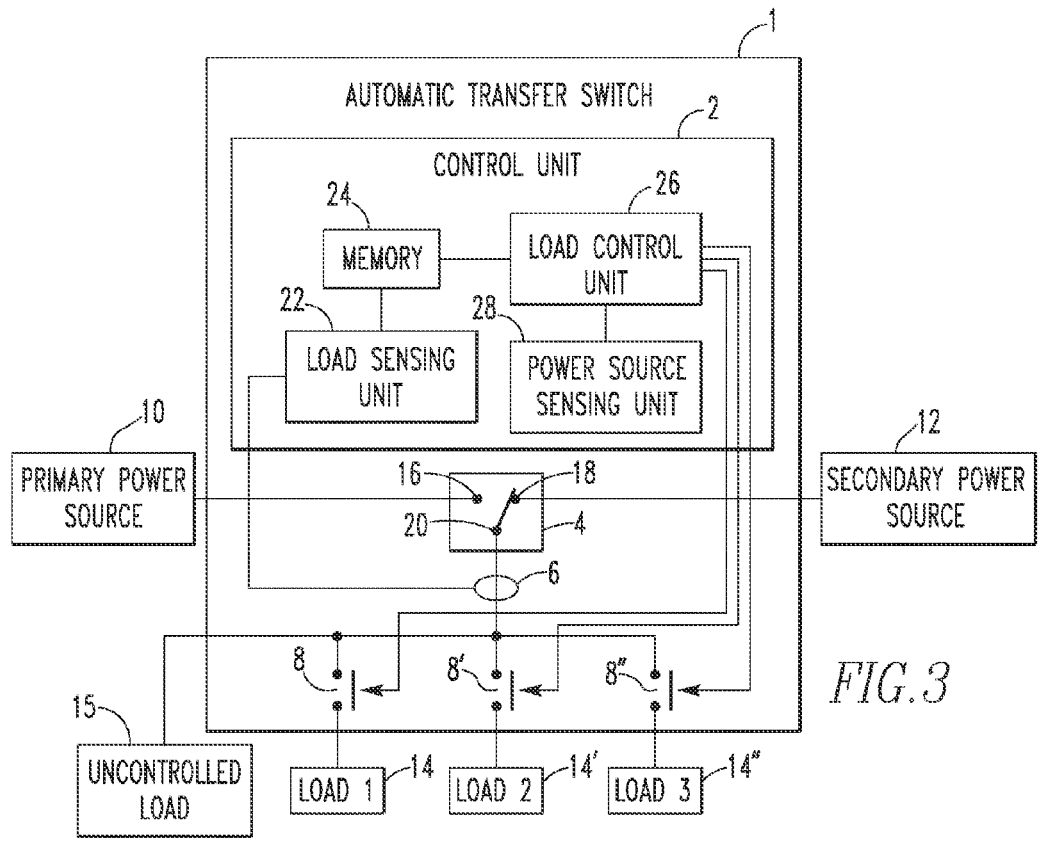
FIG. 3 is a schematic diagram of an ATS electrically connected to multiple loads in accordance with another example embodiment of the disclosed concept.

While FIGS. 1 and 2 illustrate ATS 1 and 1' electrically connected to one load 14, it is contemplated that the disclosed concept may also be applied to multiple loads. FIG. 3 illustrates the ATS 1 of FIG. 1 applied to multiple loads in accordance with an example embodiment of the disclosed concept.

In the example embodiment of FIG. 3, the ATS 1 is electrically connected to first, second, and third load 14,14', 14" and an uncontrolled load 15. However, it is contemplated that the ATS 1 may be connected to any number of loads without departing from the scope of the disclosed concept.

The uncontrolled load 15 is a load that is electrically connected to the ATS 1', but is not controlled by the load control unit 26. That is, the load control unit 26 does not sense whether the uncontrolled load 15 is attempting to turn on and does not control whether the uncontrolled load 15 is able to turn on or not. When the first switching apparatus 4 of the ATS 1' switches to the second state, the uncontrolled load 15 will turn on and be powered by the secondary power source 12 independent of load control unit 26, and the load control unit 26 will not be able to prevent the uncontrolled load 15 from turning on. Based on the power capacity of the secondary power source 12 that is left over from powering the uncontrolled load 15 (and any other uncontrolled loads), the load control unit 26 will determine whether to allow the controlled loads 14,14',14" to turn on.

The ATS 1 includes first, second, and third second switching apparatuses 8,8',8", respectively corresponding to the first, second, and third loads 14,14',14". By measuring the power drawn when each of the loads 14,14',14", the power draw of each of the loads can be stored in the memory 24 for comparison with the power capacity of the secondary power source 12. Furthermore, the load control unit 26 can use the second switching apparatuses 8,8',8" to individually control whether each of the loads 14,14',14" can turn on or off. Thus, in contrast with the uncontrolled load 15, the load control unit 26 is able to control the first, second, and third loads 14,14',14".

While the example embodiment of the disclosed concept shown in FIG. 3 applies multiple loads to the ATS 1 of FIG. 1, it is contemplated that multiple loads can similarly be applied to the ATS 1' of FIG. 2 by, for example, adding additional switches 30 to the load control unit 26'. Furthermore, it is contemplated that an ATS may include both one or more second switching apparatuses 8 and one or more switches 30 without departing from the scope of the disclosed concept.

In some example embodiments of the disclosed concept, the load control unit 26 may prioritize which loads to turn on. For example and without limitation, the first load 14 may have the highest priority, the second load 14' has the second highest priority, and the third load 14" has the third highest priority. In this case, if the power capacity of the secondary power source 12 is greater than the power draw of the first load 14, the load control unit 26 will control the second switching apparatus 8 corresponding to the first load 14 to close, thus allowing the first load 14 to turn on. If, after turning on the first load 14, the power capacity of the secondary power source 12 is greater than the power draw of the second or third loads 14',14", the load control unit 26 may allow the second and/or third loads 14',14" to turn on in their order of priority. In the case that the power capacity of the secondary power source 12 is less than the power draw of the first load 14, the load control unit 26 will control the second switching apparatus 8 corresponding to the first load 14 to open, thus preventing the first load 14 from turning on. However, if the power capacity of the secondary power source 12 is greater than the power draw of the second or third loads 14',14", the load control unit 26 may still allow the second and/or third loads 14',14" to turn on in their order of priority.

In some example embodiments of the disclosed concept, the load control unit 26 is also able to cause lower priority loads to turn off in order to free up enough power capacity to allow a higher priority load to turn on. For example, if the first load 14 is turned off and the power capacity of the secondary power source 12 is less than power draw of the first load 14, but turning off the third load 14" will increase the power capacity of the secondary power source 12 so that it is greater than the power draw of the first load 14, the load control unit 26 may turn off the third load 14" by opening it corresponding second switching apparatus 8"' and turn on the first load 14 by closing its corresponding second switching apparatus 8.

Figure 4:
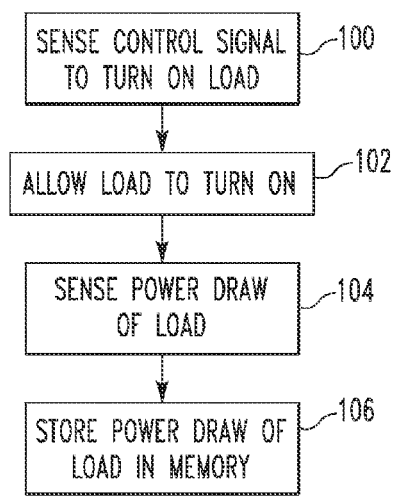
FIG. 4 is a flowchart of a method of sensing the power draw of a load in accordance with an example embodiment of the disclosed concept.

FIG. 4 is a flowchart of a method of initially sensing the power draw of a load in accordance with an example embodiment of the disclosed concept. The method of FIG. 4 may be implemented in the in the ATS 1,1' of FIG. 1, 2, or 3. At 100, the load control unit 26,26' senses a control signal to turn on the load 14. At 102, the load control unit 26,26' allows the load to turn on by closing the second switching apparatus 8 of the closing the switch 30. At 104, the load sensing unit 22 senses the power draw of the load 14 based on changes in the output of the sensor 6. At 106, the load sensing unit 22 stores the sensed power draw of the load 14 in the memory 24.

It is contemplated that the method of FIG. 4 may be modified to determine whether to turn on the load 14 without departing from the scope of the disclosed concept. In the case that the power draw of the load 14 is unknown, the load control unit 26 may determine whether to allow the load 14 to turn on based on the percentage of maximum power capacity the secondary power source 12 is operating at. For example and without limitation, if the secondary power source 12 is operating at less than 80% of maximum power capacity, the load control unit 26 may allow the load 14 to turn on. However, if the secondary power source 12 is operating at greater than 80% of maximum power capacity, the load control unit 26 may prevent the load 14 from turning on.

In the case that the power draw of the load 14 is known, the load control unit 26 may compare the power capacity of the secondary power source 12 to the power draw of the load 14 to determine whether to allow the load 14 to turn on. If the power capacity of the secondary power source 12 is greater than the power draw of the load 14, the load control unit 26 may allow the load 14 to turn on. If the power capacity of the secondary power source 12 is less than the power draw of the load 14, the load control unit 26 may prevent the load 14 from turning on.

Figure 5:
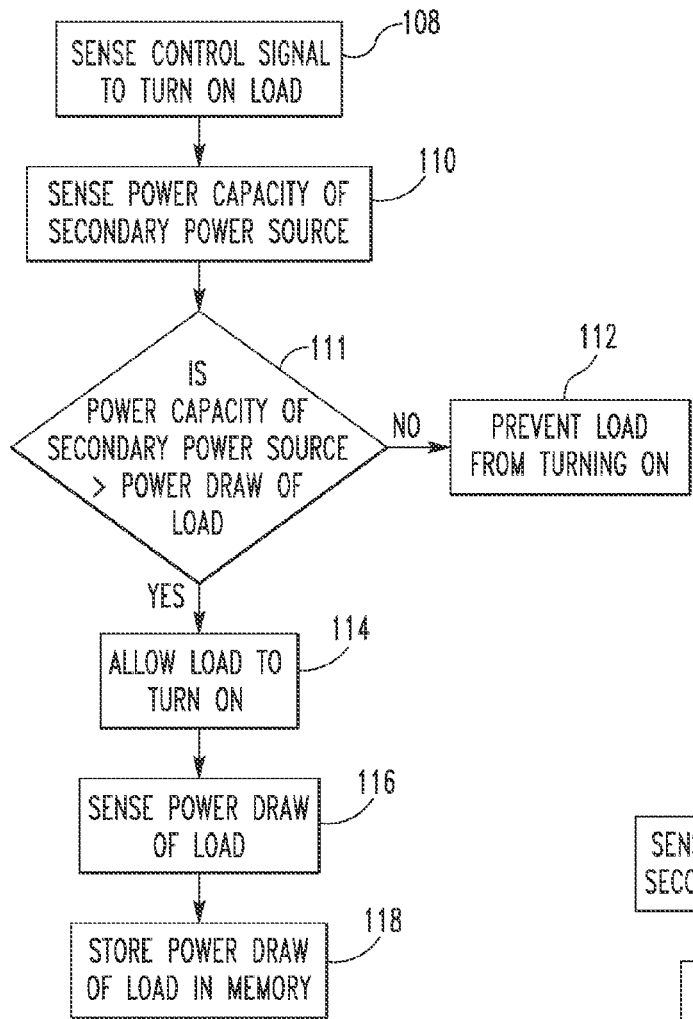
FIG. 5 is a flowchart of a method of managing a load in accordance with an example embodiment of the disclosed concept.

FIG. 5 is a flowchart of a method of managing a load in accordance with an example embodiment of the disclosed concept. The method of FIG. 5 may be implemented in the in the ATS 1,1' of FIG. 1, 2, or 3 when the first switching apparatus 4 is in the second state (i.e., the secondary power source 12 is providing power). At 108, the load control unit 26 senses a control signal to turn on the load 14. At 110, the power source sensing unit 28 senses the power capacity of the secondary power source 12. At 111, the load control unit 26 determines whether the power capacity of the secondary power source 12 is greater than the power draw of the load 14. If the power capacity of the secondary power source 12 is greater than the power draw of the load 14, the load control unit 26 allows the load to turn on at 114. If the power capacity of the secondary power source 12 is less than the power draw of the load 14, the load control unit 26 prevents the load 14 from turning on at 112.

When the load 14 turns on, the load sensing unit 22 senses the power draw of the load 14 at 116. The load sensing unit 22 then stores the power draw of the load 14 in the memory 24 at 118. By sensing the power draw of the load 14 each time it is turned on, changes in the power draw of the load 14 over time can be accounted for.

Figure 6:
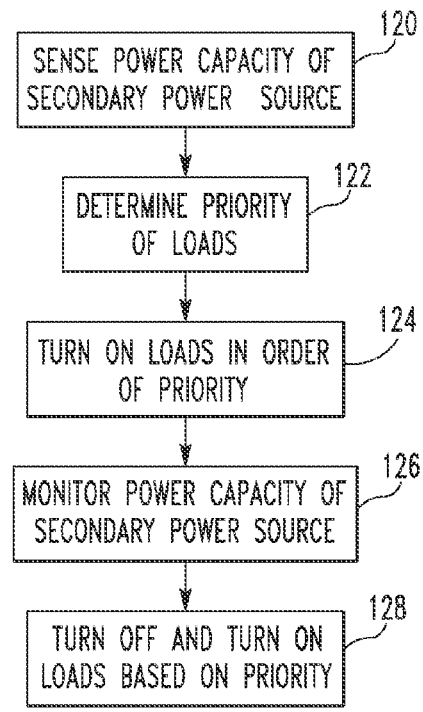
FIG. 6 is a flowchart of a method of prioritizing loads in accordance with an example embodiment of the disclosed concept.

FIG. 6 is a flowchart of a method of prioritizing loads in accordance with an example embodiment of the disclosed concept. The method of FIG. 6 may be implemented in the in the ATS 1,1' of FIG. 1, 2, or 3 when the first switching apparatus 4 is in the second state (i.e., the secondary power source 12 is providing power) and when multiple loads are electrically connected to the ATS 1,1'. At 120, the power source sensing unit 28 senses the power capacity of the secondary power source 12. At 122, the load control unit 26 determines the priority of the loads. The priority of the loads may be stored in the memory 24. At 124, the load control unit 26 turns on the loads in their order of priority. That is, the load control unit 26 first turns on the highest priority load if the power capacity of the secondary power source 12 is greater than the power draw of the highest priority load. The load control unit 26 repeats the process for each of the loads in their order of priority.

After initially turning on the loads in their order of priority, the power source sensing unit 28 and the load control unit 26 continue to monitor the power capacity of the secondary power source 12 at 126. At 128, the load control unit 26 turns off and turns on loads based on their priority. In more detail, if the power capacity of the secondary power source 12 changes such that a higher priority load can be turned on by turning off one or more lower priority loads, the load control unit 26 will turn off the lower priority loads and turn on the higher priority load.

It is contemplated that any or all of the load sensing unit 22, the load control unit 26,26' and the power source sensing unit 28 may include a processor. The processor may be, for example and without limitation, a microprocessor, a microcontroller, or some other suitable processing device or circuitry, that interfaces with the memory. It is also contemplated that the memory 24 can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory.

It is further contemplated that the disclosed concept can be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An automatic transfer switch comprising:
    a first switching apparatus having a first state to electrically connect a plurality of loads to a primary power source and a second state to electrically connect the at least one of the loads to a secondary power source;
    a sensor structured to sense information related to the power draw of the plurality of loads; and
    a control unit structured to determine a priority order of the loads and, for each of the loads in order of their priority, to determine the power draw of the load during a predetermined starting period of the load based on the output of the sensor, to compare the power draw of the load during the predetermined starting period to a power capacity of the secondary power source, to allow the load to turn on if the power capacity of the secondary power source is at least greater than the power draw of the load during the predetermined starting period, and to otherwise prevent the load from turning on,
    wherein the power draw of at least one of the loads during the predetermined starting period is greater than the power draw of the at least one of the loads during after the predetermined starting period, and
    wherein the control unit is structured to monitor the power capacity of the secondary power source and, if turning off one or more lower priority loads will cause the power capacity of the secondary power source to become greater than a power draw of one or more higher priority loads during the predetermined starting period, the control unit is structured to turn off one or more of the lower priority loads and to turn on one or more of the higher priority loads.

2. The automatic transfer switch of claim 1, wherein the control unit includes a load control unit structured to determine and control whether each load is allowed to turn on or is prevented from turning on.

3. The automatic transfer switch of claim 2, wherein the load control unit includes a switch,
    wherein opening the switch prevents a control signal to turn on one of the loads from reaching the one of the loads and closing the switch allows the control signal to turn on the one of the loads to reach the one of the loads, and
    wherein the load control unit controls the switch to close to allow the one of the loads to turn on and to open to prevent the one of the loads from turning on.

4. The automatic transfer switch of claim 3, wherein the one of the loads is an air conditioning unit, and wherein the control signal to turn on the one of the loads is generated by a thermostat.

5. The automatic transfer switch of claim 1, further comprising:
    a second switching apparatus electrically connected between the first switching apparatus and one of the loads,
    wherein the second switching apparatus is structured to electrically disconnect the first switching apparatus and the one of the loads when opened and to electrically connect the first switching apparatus and the one of the loads when closed, and
    wherein the load control unit is structured to control the second switching apparatus to close to allow the one of the loads to turn on and to open to prevent the one of the loads from turning on.

6. The automatic transfer switch of claim 5, wherein the second switching apparatus includes a relay.

7. The automatic transfer switch of claim 1, wherein the control unit includes a power source sensing unit structured to sense the power capacity of the secondary power source by subtracting power drawn from the power source from a maximum power capacity of the secondary power source.

8. The automatic transfer switch of claim 1, wherein the control unit includes a load sensing unit structured to determine the power draw of the loads based on a change in the output of the sensor.

9. The automatic transfer switch of claim 8, wherein the control unit includes a memory structured to store the power draw of the loads.

10. The automatic transfer switch of claim 1, wherein the control unit is structured to allow a selected one of the loads to turn on if the power capacity of the secondary power source is greater than the power draw of the selected load during the predetermined starting period plus a predetermined percentage, and to otherwise prevent the selected load from turning on.

11. The automatic transfer switch of claim 1, wherein the sensor is a current sensor structured to sense an amount of current flowing between the first switching apparatus and the loads.

12. The automatic transfer switch of claim 1, wherein the primary power source is utility power and the secondary power source is a generator.

13. The automatic transfer switch of claim 1, wherein the power draw of the loads is determined in absolute units.

14. The automatic transfer switch of claim 1, wherein at least one of the loads is an uncontrolled load that the control unit is unable to allow or prevent from turning on.

15. A method of managing loads electrically connected to an automatic transfer switch structured to switch between a primary power source and a secondary power source, the method comprising:
- sensing a control signal to turn on a selected one of the loads;
- sensing a power capacity of the secondary power source;
- determining a priority order of the loads;
- sensing a power draw of each of the loads during a predetermined starting period of each of the loads;
- for each of the loads in order of their priority, comparing the power draw of the load during the predetermined starting period to the power capacity of the secondary power source, allowing the load to turn on if the power capacity of the secondary power source is at least greater than the power draw of the load during the predetermined starting period, and otherwise preventing the load from turning on;
- monitoring the power capacity of the secondary power source; and
- if turning off one or more lower priority loads will cause the power capacity of the secondary power source to become greater than a power draw of one or more higher priority loads, turning off one or more of the lower priority loads and turning on one or more of the higher priority loads.

* * * * *